(12) United States Patent
Miyazaki et al.

(10) Patent No.: US 7,570,843 B2
(45) Date of Patent: Aug. 4, 2009

(54) OPTICAL MODULATION ELEMENT MODULE

(75) Inventors: Norikazu Miyazaki, Tokyo (JP); Masataka Yokozawa, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 11/233,573

(22) Filed: Sep. 23, 2005

(65) Prior Publication Data

US 2006/0115226 A1 Jun. 1, 2006

(30) Foreign Application Priority Data

Sep. 30, 2004 (JP) ............... 2004-286432

(51) Int. Cl.
*G02F 1/035* (2006.01)
(52) U.S. Cl. ............................... 385/3; 385/2
(58) Field of Classification Search ............ None
See application file for complete search history.

(56) References Cited

U.S. PATENT DOCUMENTS

| 5,074,631 | A | * | 12/1991 | Hamano et al. | ........ 385/3 |
| 5,157,744 | A | * | 10/1992 | Korotky | ........ 385/2 |
| 5,278,923 | A | * | 1/1994 | Nazarathy et al. | ........ 385/3 |
| 5,291,565 | A | * | 3/1994 | Schaffner et al. | ........ 385/3 |
| 5,543,952 | A | * | 8/1996 | Yonenaga et al. | ........ 398/185 |
| 6,334,008 | B2 | * | 12/2001 | Nakabayashi | ........ 385/14 |
| 6,552,837 | B2 | * | 4/2003 | Mirshekar-Syahkal et al. | ... 359/245 |

FOREIGN PATENT DOCUMENTS

JP 2003-202530 7/2003

\* cited by examiner

*Primary Examiner*—Omar Rojas
(74) *Attorney, Agent, or Firm*—Chapman and Cutler LLP

(57) ABSTRACT

The present invention provides an optical modulation element module which is capable of the optical modulation for analog transmission with a low driving voltage and low chirp.

An optical modulation element module, in which Mach-Zehnder type optical modulation element 50 having a Mach-Zehnder type waveguide unit having two branched waveguides on a substrate which has electro-optical effect and two modulation electrodes which apply a modulation signal to each branched waveguide, optical input and output units for inputting and outputting a light wave to and from the optical modulation element, and a modulation signal input unit 56 for inputting the modulation signal into the modulation electrodes are placed in a case 51, includes a transformer branching unit 57 in which the modulation signal input unit which corresponds to the two modulation electrodes is formed as one terminal and which divides the modulation signal from the modulation signal input unit into two signals, and applies the divided modulation signals to each modulation electrode.

6 Claims, 5 Drawing Sheets

(a)

(b)

(a)

(b)

OPTICAL MODULATION ELEMENT MODULE

BACKGROUND OF THE INVENTION

1. Field of the Invention

The present invention relates to an optical modulation element module, more particularly, to an optical modulation element module capable of being suitably used in an analog optical transmission system.

2. Description of the Related Art

In an analog optical transmission system, when an optical CATV transmission system is placed in 1.55 μm band, a problem occurs in the light dispersion in a fiber. Therefore, a modulation method which uses an external modulator for acquiring preferable transmission properties has been used. In modulators used for the above method, it is important to prevent wavelength chirping which is generated by intensity modulation. For this reason, Mach-Zehnder type external optical modulator (hereinafter, referred to as MZ type optical modulation element) using $LiNbO_3$ (hereinafter, referred to as LN), in which the wavelength chirping is hardly generated, is widely used.

The MZ optical modulation element includes a Mach-Zehnder type waveguide unit (hereinafter, referred to as MZ waveguide unit) which is configured by a branching unit, such as a Y-branch or a coupler, for branching inputted light, two branched waveguides for propagating each branched light component, and an interfering unit, such as the Y-branch or the coupler, for multiplexing two light components. A modulation electrode is disposed along the branched waveguides. The modulation electrode modulates phases of the light components which propagate inside the branched waveguides on the basis of the modulation signal from a modulation signal input unit such as a connector. A region, that the light component inside the branched waveguide is phase-modulated by an electric field formed by the modulation electrode, is referred to as an interaction portion.

On the basis that the phase-changes in the respective branched waveguides are $\phi1$ and $\phi2$, when $\phi1=-\phi2$, a zero chirp modulator that the chirping is not generated in principle by modulating the intensity may be obtained. The zero chirp modulator may be, for example, a modulator having symmetric structure using an X-cut LN substrate as shown in FIG. 1, a modulator (hereinafter, referred to as a dual modulator) having two modulation electrodes using a Z-cut LN substrate as shown in FIG. 2, and a modulator (see Japanese Unexamined Patent Application Publication No. 2003-202530) which domain-inverts a part of the substrate by using a Z-cut LN substrate as shown in FIG. 3, and so on.

In the analog transmission modulator, an analog transmission modulator is not configured by a single MZ waveguide, but the phase-modulator for suppressing fiber Simulated Brillouin Scattering (SBS) is integrated and a plurality of optical modulation elements are connected to each other in order to linearize a transfer function of the MZ type optical modulator. Accordingly, it is important to reduce the size of each element and control the increase in the driving voltage as much as possible.

An overview of the LN modulator is shown in FIGS. 1A and 1B. An optical modulation element 3 has an MZ type waveguide which includes an input waveguide 5, a Y type branched waveguide for branching a light component, branched waveguides 6, 7, a Y type branched waveguide for multiplexing light components, and an output waveguide 8 on an X-cut LN substrate 4. Additionally, on the LN substrate 4 including the waveguide, a modulation electrode 12, ground electrodes 11, 13, and a bias electrode 14 are formed.

FIG. 1B is a cross-sectional diagram of the optical modulation element 3 taken along one dot chain line A in FIG. 1A.

One end of the modulation electrode 12 of the optical modulation element 3 is electrically connected to a modulation signal input unit 15 and the other end is connected to an RF terminal 16. Also, the bias electrode 14 is electrically connected to a bias controlling DC input unit 17. The optical modulation element 3 is hermetically sealed in a metal case 18.

The light is introduced into the optical modulation element 3 from an optical input means 1, which is provided outside the metal case 18, through the optical fiber 2. And then, the light outputted from the optical modulation element 3 is derived to an optical output means 10 through an optical fiber 9. A modulation signal for driving the optical modulation element 3 or a DC signal for controlling the bias are inputted from the external of the metal case 18 through the modulation signal input unit 15 or the DC input unit 17 for controlling the bias.

The X-cut LN modulator shown in FIG. 1 generally has low modulation efficiency, thus, it has a problem in that the driving voltage becomes higher. Especially, when using the optical modulators in multiple-stage, the length of each optical modulation element is restricted. Therefore, the driving voltage becomes higher and an amplifier for driving the modulator is needed to have high power. When integrating phase modulators, it is difficult to reduce the driving voltage due to the structure of the X-cut LN modulator. There is a problem in that the phase modulation unit occupies most of the interaction length and the interaction length of the intensity modulation unit is restricted. In X-plate LN crystal, a frequency response of modulation properties is deteriorated by acousto-optic (AO) effect. Accordingly, a measure for preventing the above-mentioned deterioration is required.

Next, an overview of a dual modulator will be described with respect to FIGS. 2A and 2B. Hereinafter, the like parts as the above-described parts will be denoted by the same reference numerals, and the description thereof will be omitted. In an optical modulation element 20, MZ type waveguides 5 to 8 are formed on a Z-cut LN substrate 21. Additionally, modulation electrodes 23, 25, ground electrodes 22, 24, 26, and a bias electrode 31 are formed on the LN substrate 21 including the waveguides.

FIG. 2B is a cross-sectional diagram of the optical modulation element 20 taken along one dot chain line A in FIG. 2A.

In the modulation electrodes 23, 25 of the optical modulation element 20, one end of each modulation electrode is electrically connected to the modulation signal input units 27, 28, and the other end is connected to RF terminals 29, 30, respectively. Additionally, a bias electrode 31 is electrically connected to the bias controlling DC input unit 17. The optical modulation element 20 is hermetically sealed in a metal case 18.

A modulation signal and a bias controlling DC signal for driving the optical modulation element 20 are inputted from the outside of the metal case 18 through the modulation signal input units 27, 28 and the bias controlling DC input unit 17.

As shown in FIG. 2, the dual modulator using the Z-cut LN substrate may have a low driving voltage and may reduce property-deterioration according to the AO effect. However, it is needed to input two complementary modulation signals as input signals. For this reason, two-output type driver is needed in a peripheral circuit in order to input the modulation signals. However, it is difficult to obtain the two-output type driver, which may have higher properties over the large bandwidth and low price, and the two-output type driver is much more expensive than a single output type driver. Generally, there are problems in that elements such as a phase shifter and the like are needed to obtain optimal modulation, and configuration or adjustment of the circuit becomes complicated.

An overview of a modulator which domain-inverts a part of a substrate is shown in FIGS. 3A and 3B. An optical modulation element 40 domain-inverts a part of the Z-cut LN substrate 21 and a domain-inverted region is denoted by a reference numeral 48. The MZ type waveguides 5 to 8 are formed on the LN substrate 21. Additionally, a modulation electrode 42, ground electrodes 41, 43, 44, and a bias electrode 47 are formed on the LN substrate 21 in which the waveguides are formed.

FIG. 3B is a cross-sectional diagram of the optical modulation element 40 taken along one dot chain line A in FIG. 3A.

In the modulation electrode 42 of the optical modulating element 40, one end of the modulation electrode is electrically connected to the modulation signal input unit 15, and the other end is connected to RF terminals 45, 46. Additionally, the bias electrode 47 is electrically connected to the bias controlling DC input unit 17. The optical modulation element 40 is hermetically sealed in a metal case 18.

A modulation signal and a bias controlling DC signal for driving the optical modulation element 40 are inputted from external of the metal case 18 through a modulation signal input unit 15 and the bias controlling DC input unit 17.

As shown in FIG. 3, a zero chirp modulator can be configured by using the Z-cut LN substrate and by inverting a polarizing direction of the crystal in a part of the LN substrate. Generally, in order to match the impedance of inside the modulator with that of outside the modulator, the line impedance of the interaction portion after branching is needed to be high impedance which is double of the input impedance. For example, when the input impedance is 50 Ω, each line impedance is 100 Ω. Especially, in coplanar waveguide (CPW) which is widely used in an LN modulator, there are problems, in that it is difficult to simultaneously satisfy conditions such as high impedance, speed matching of the electric signal with the light wave, and high modulation efficiency, and so on due to the dielectric constant of the LN substrate.

Accordingly, it is an object of the present invention to provide an optical modulation element module which can solve the above-described problems and is capable of the optical modulation for analog transmission with a low driving voltage and low chirp.

SUMMARY OF THE INVENTION

According to a first aspect of the present invention, an optical modulation element module, in which Mach-Zehnder type optical modulation element having a Mach-Zehnder type waveguide unit having two branched waveguides on a substrate which has electro-optical effect and two modulation electrodes which apply a modulation signal to each branched waveguide, optical input and output units for inputting and outputting a light wave to and from the optical modulation element, and a modulation signal input unit for inputting the modulation signal into the modulation electrodes are placed in a case, includes a transformer branching unit in which the modulation signal input unit which corresponds to the two modulation electrodes is formed as one terminal and which divides the modulation signal from the modulation signal input unit into two signals, and applies the divided modulation signals to each modulation electrode.

According to a second aspect of the invention, in the transformer branching unit, an electric power branching rate of an output port is 1:1 and a phase difference of each branched signal is 180°.

According to a third aspect of the invention, in a region, in which one of the branched waveguides of the Mach-Zehnder type optical modulation element is formed, a crystal axis of the substrate is domain-inverted. In the transformer branching unit, the electric power branching rate of an output port is 1:1 and a phase difference of each branched signal is 0°.

According to a fourth aspect of the invention, in the transformer branching unit, an input impedance is matched with an impedance of the modulation signal input unit, and an output impedance is matched with a line impedance of each modulation electrode of 50 Ω or less.

According to a fifth aspect of the invention, the substrate of the MZ type optical modulation element is a Z-cut LiNbO$_3$ substrate.

According to a sixth aspect of the invention, the transformer branching unit uses a transmission line type transformer.

According to the first aspect of the invention, the modulation signal input unit corresponding to the two electrodes is formed as one terminal, and the modulation signal from the modulation signal input unit is divided into two signals and applied to each modulation electrode by the transformer branching unit. Accordingly, only one terminal for inputting the modulation signal is needed as the optical modulator having a single modulation electrode and the optical modulation element may be simply treated. Furthermore, because the optical modulation element is driven by two modulation electrodes, the driving voltage can be reduced and the modulation efficiency can be improved.

According to the second aspect of the invention, in the transformer branching unit, because the electric power branching rate of an output port is 1:1 and the phase difference of each branched signal is 180° (hereinafter, referred to as reverse phase type transformer branching unit), it is possible to apply the modulation signal that amplitudes of the two modulation electrodes are same and the phase difference is 180°. Accordingly, it is possible to realize the optical modulator having low chirp and low driving voltage even though inputting a single modulation signal, which is the same as the dual modulator.

According to the third aspect of the invention, in a region which one of the branched waveguide of the MZ type optical modulation element is formed, the crystal axis of the substrate is domain-inverted. In the transformer branching unit, the electric power branching ratio of the output port is 1:1 and the phase difference of each branched signal is 0° (hereinafter, referred to as synchronous type transformer branching unit). Accordingly, it is possible to realize the optical modulator with low chirp and a low driving voltage, which is similar to the second aspect, and for the synchronous type transformer branching unit, it may be easier to obtain broader band components and it may be possible to realize wider frequency response properties of the optical modulator than the reverse-phase type transformer branching unit.

According to the fourth aspect of the invention, in the transformer branching unit, the input impedance is matched with the impedance of the modulation signal input unit and the output impedance is matched with the line impedance of each modulation electrode with the impedance value of 50 Ω or less. Accordingly, it is possible to control the reflection of the modulation signal in the connection of the line, and to supply an optical modulator having a high frequency property by matching the respective impedances. Furthermore, it is possible to use design of a dual modulator of related art by reducing the line impedance of the modulation electrode of the optical modulation element, to 50 Ω or less. Furthermore, it is possible to reduce the interval between the modulation electrode and the ground electrode of the optical modulation element by reducing the line impedance of the modulation electrode. It is also possible to realize high-efficiency modulation by increasing the distribution of the electric field which is applied to the waveguide. As the result, it is possible to further reduce the corresponding line impedance to a lower value, and it is possible to further reduce the driving voltage of the optical modulation element by matching the impedances between the transformer branching unit and the modulation electrode.

According to fifth aspect of the invention, because the substrate of the MZ type optical modulation element is a Z-cut LiNbO$_3$ substrate, it is possible to provide an optical modulator having higher modulation efficiency and more stabilized operation properties than the case of using an X-cut substrate or a substrate other than the LiNbO$_3$ substrate.

According to the sixth aspect of the invention, because the transformer branching unit uses the transmission line type transformer, a high frequency signal may be branched in the broadband with low loss. For example, it is possible to provide the optical modulator having several tens of MHz to 1 GHz operating bandwidth required when transmitting optical CATV.

REFERENCE NUMERALS

1: OPTICAL INPUT MEANS
2, 9: OPTICAL FIBER
5: INPUT WAVEGUIDE
6, 7: BRANCHED WAVEGUIDE
8: OUTPUT WAVEGUIDE
10: OPTICAL OUTPUT MEANS
15, 56: MODULATION SIGNAL INPUT UNIT
17: BIAS CONTROLLING DC INPUT UNIT
50, 60, 70: OPTICAL MODULATION ELEMENT
51: METALCASE
52: OPTICAL BRANCHING UNIT
53, 54: PHASE MODULATOR
55: OPTICAL INTERFERING UNIT
57, 63, 72: TRANSFORMER BRANCHING UNIT
61, 62: MODULATION ELECTRODE
64, 73: MODULATION SIGNAL BRANCHING CIRCUIT
65, 74: BIAS ELECTRODE
66, 67: RF TERMINAL
71: DOMAIN-INVERTED REGION

DESCRIPTION OF THE PREFERRED EMBODIMENTS

Hereinafter, an optical modulation element module according to an embodiment of the invention will be described in detail.

Figure 4:
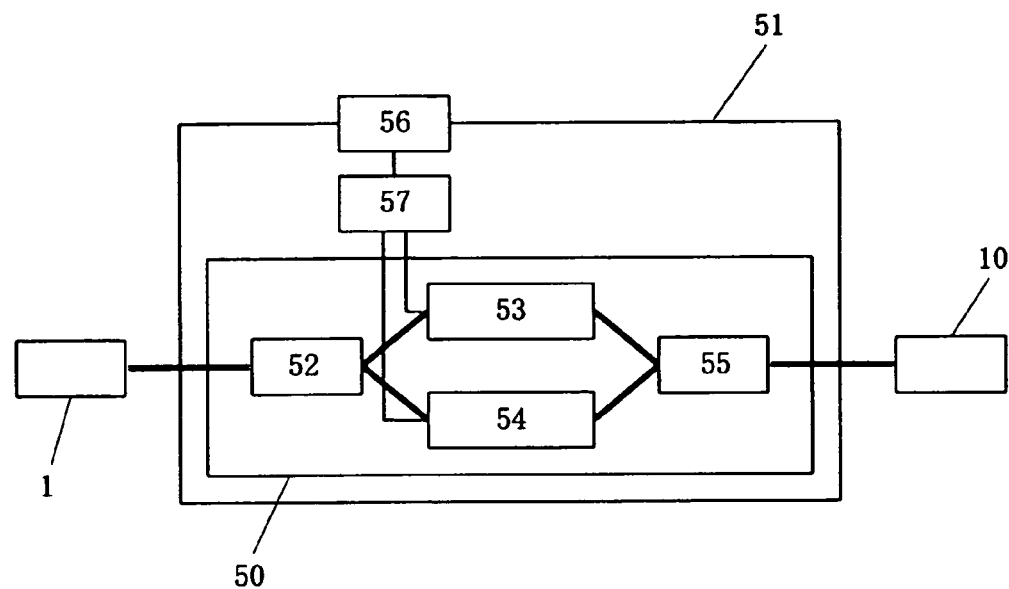
FIG. 4 is a block diagram schematically showing an optical modulation element module according to an embodiment of the invention.

FIG. 4 is a block diagram schematically showing an optical modulation element module according to the embodiment of the invention.

As shown in FIG. 4, a modulation signal input unit 56 for inputting a modulation signal, a transformer branching unit 57 for dividing the modulation signal into two signals, an MZ type optical modulation element 50 which uses electro-optical effect, and optical input and output units such as optical fibers, and so on are integrated to be placed in a metal case 51 as a single package.

The modulation signal inputted in the modulation signal input unit 56 is divided into two signals by the transformer branching unit 57 in a modulator which is a transformer type branching element to feed powers to the modulation electrodes of the optical modulation element 50. On the other hand, a light component outputted from an optical input means 1 such as a laser and so on is inputted to a substrate of an MZ type optical modulator, which includes an optical branching unit 52, an optical interfering unit 55, and two branched waveguides, via the optical input unit such as the fiber. The modulated light component outputted from the optical input means 1 is also outputted to an optical output means 10 which exists outside of the modulator via the optical output unit such as the fiber. A part which modulates a phase of the light wave of the branched waveguide by the optical modulation electrode is referred to as a phase modulator. The reference numerals 53, 54 in FIG. 4 indicate the phase modulator.

Figure 1:
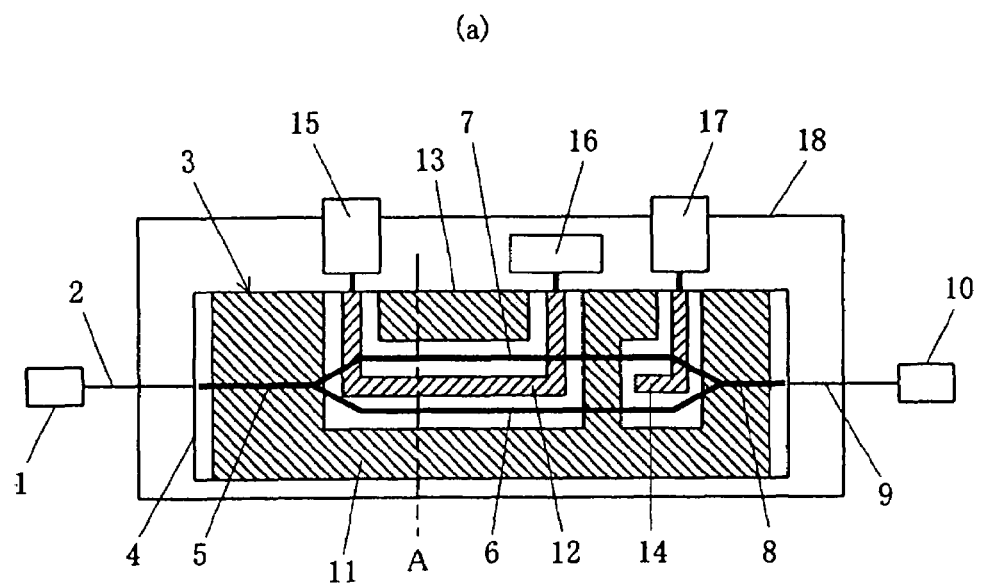
FIG. 1 is a schematic diagram showing an optical modulator with a single modulation electrode according to the related art.
Figure 1:
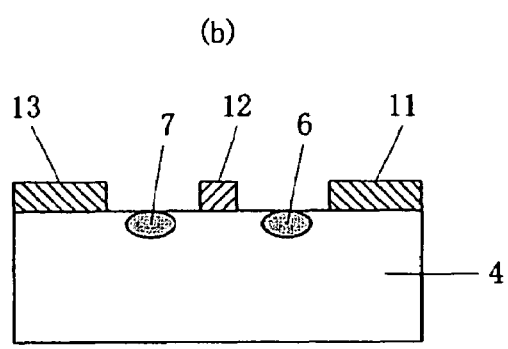
Figure 2:
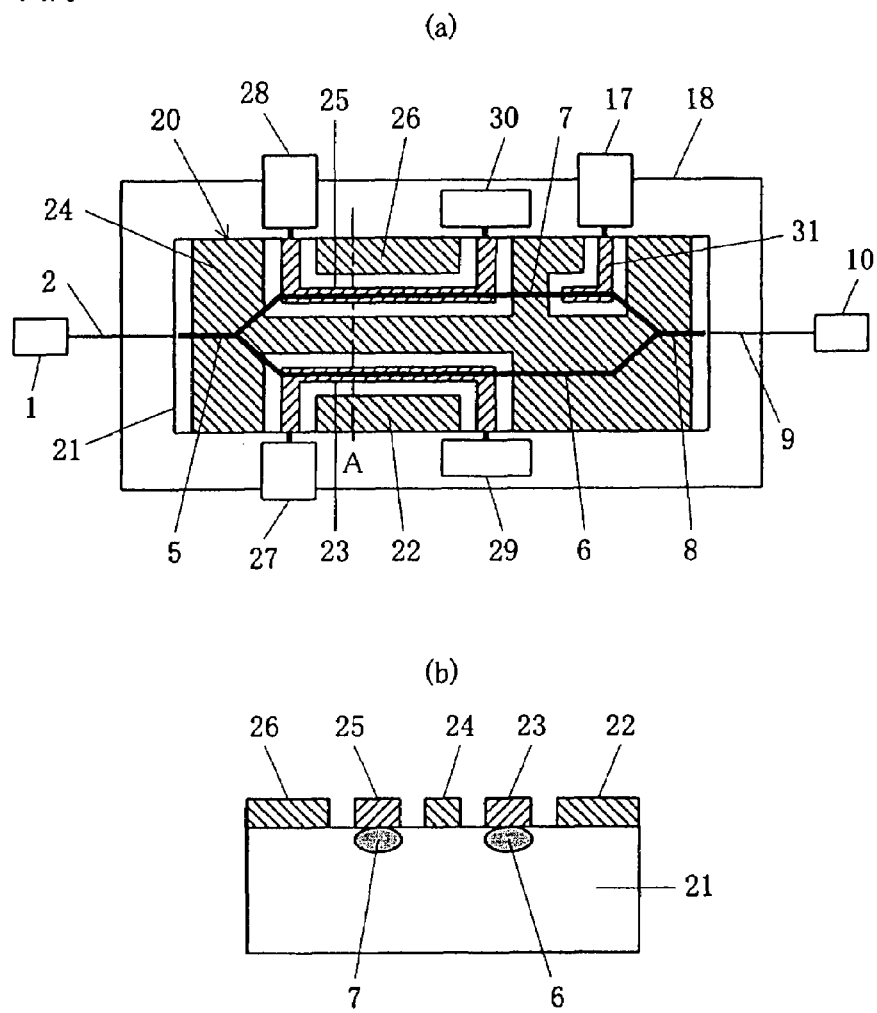
FIG. 2 is a schematic diagram showing a dual modulator according to the related art.
Figure 3:
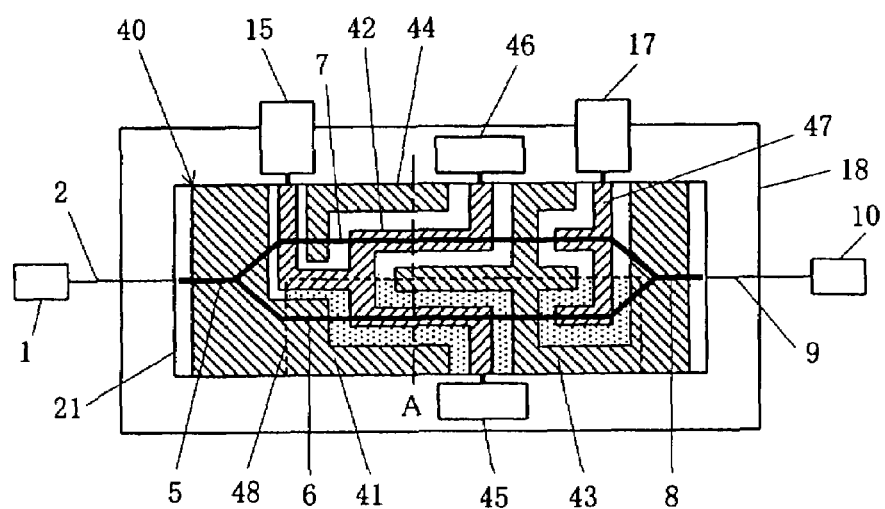
FIG. 3 is a schematic diagram showing an optical modulator which uses domain-inversion according to the related art.
Figure 3:
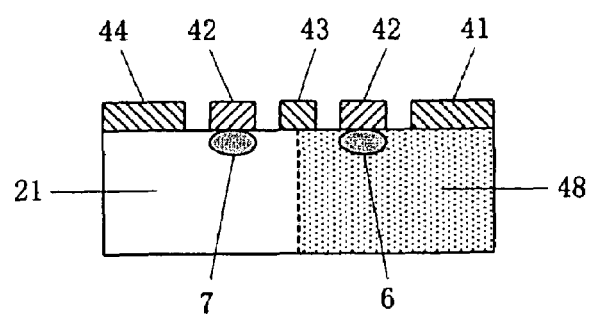

The branching rate and the phase difference of the modulation signal in the transformer branching unit 57 are set so that the absolute values of the amount of the phase-change of the light are equal to each other and symbols thereof are inverted with respect to the light components modulated by the phase modulator 53, 54 of the optical modulation element. According to such configuration, the optical modulation element module according to an embodiment of the invention can be simply used as the single electrode type modulator as shown in FIG. 1. The driving voltage of the modulator also can be reduced like the dual modulator which has good modulation efficiency as shown in FIG. 2.

At this time, when a transmission-line type transformer is used as the transformer of the branching unit, it is possible to branch the high frequency signal at a broadband with a low loss, and the optical modulator, which has a band of several tens of MHz to 1 GHz required in an optical CATV transmission, can be provided. In addition, because the transformer branching unit is capable of phase-inverting the signal and converting input and output impedances as well as dividing the modulation signal, a high performance optical modulator can be configured by the combination thereof.

Figure 5:
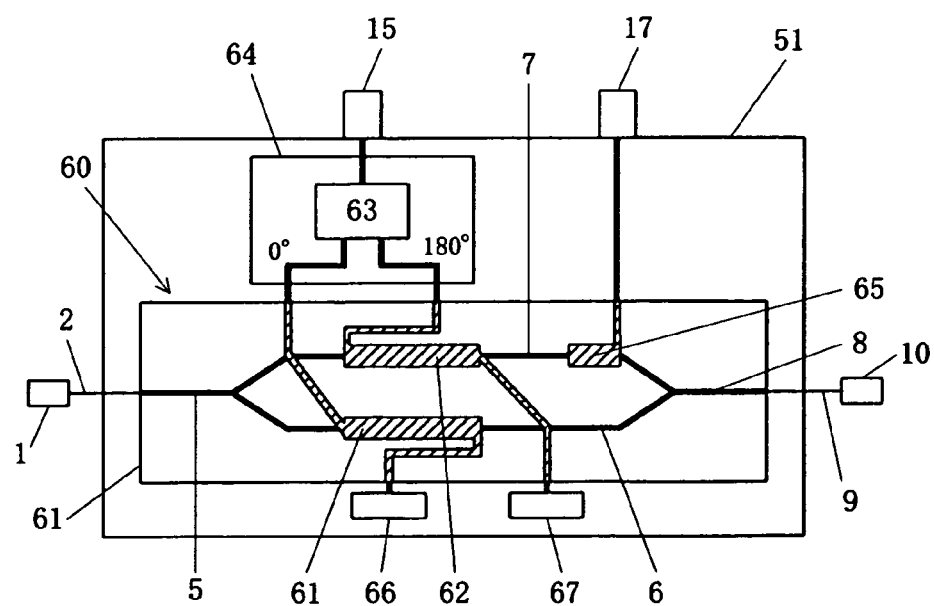
FIG. 5 is a schematic diagram showing an optical modulation element module according to an embodiment of the invention.

FIG. 5 shows an optical modulation element module according to an embodiment of the invention. In FIG. 5, ground electrodes will be omitted in order to simplify the explanation. A modulation signal branching circuit 64 uses the transmission-line transformer whose input impedance is 50 Ω, output impedance is 50 Ω, and phase difference of the output signals is 180°. The optical modulation element 60 includes MZ type waveguide units 5 to 8 formed on a Z-cut LN crystal substrate 61 by Ti diffusion, and modulation electrodes 61, 62 having line impedance 50 Ω in each phase-modulator.

Even though the MZ type waveguides in FIG. 5 have a waveguide configuration constituted by Y-type branching units having one input and one output (hereinafter, described as 1×1), it is preferable that the MZ type waveguides have various input/output waveguide configurations such as 1×2, 2×1, 2×2, and so on by using a directional coupler or a multimode interferometer type (MMI) coupler. In addition, from the transformer branching unit 63 to the phase-modulator, the transmission line is configured by an electrode pattern that has the same line configuration or the same line length, in order to prevent the difference of the electric properties such as the phase, intensity, and so on between two modulation electrodes 61, 62. An end of each modulation electrode is connected to the RF terminals 66, 67 and reflection of the modulation signal is prevented.

The line configurations or the interaction lengths (length in which the light in the waveguide is influenced by the modulation interaction of the electric field formed by the modulation electrode) of the modulation electrodes in the phase-modulator are designed so that the electric properties of the modulation electrodes, such as the driving voltage and the frequency response, become equal like the transmission lines of the modulation electrodes.

The bias electrode 65 shown in FIG. 5 applies the DC signal in order to control a bias point of the optical modulation element 60 having the MZ type waveguide units. In respect to this, the difference of the light path length in the branched waveguide of the MZ type waveguide unit may be previously adjusted to have a predetermined bias point without providing the bias electrode.

In the experimental optical modulation element module, almost zero chirp modulator, in which, at 50 MHz to 800 MHz, the change of the electric optical frequency response is less than 1 dB, the reflection of the electric is less than −18 dB, and the absolute value of line-width increasing coefficient α, which indicates the amount of the chirp of the modulator, is less than 0.1, can be obtained.

Figure 6:
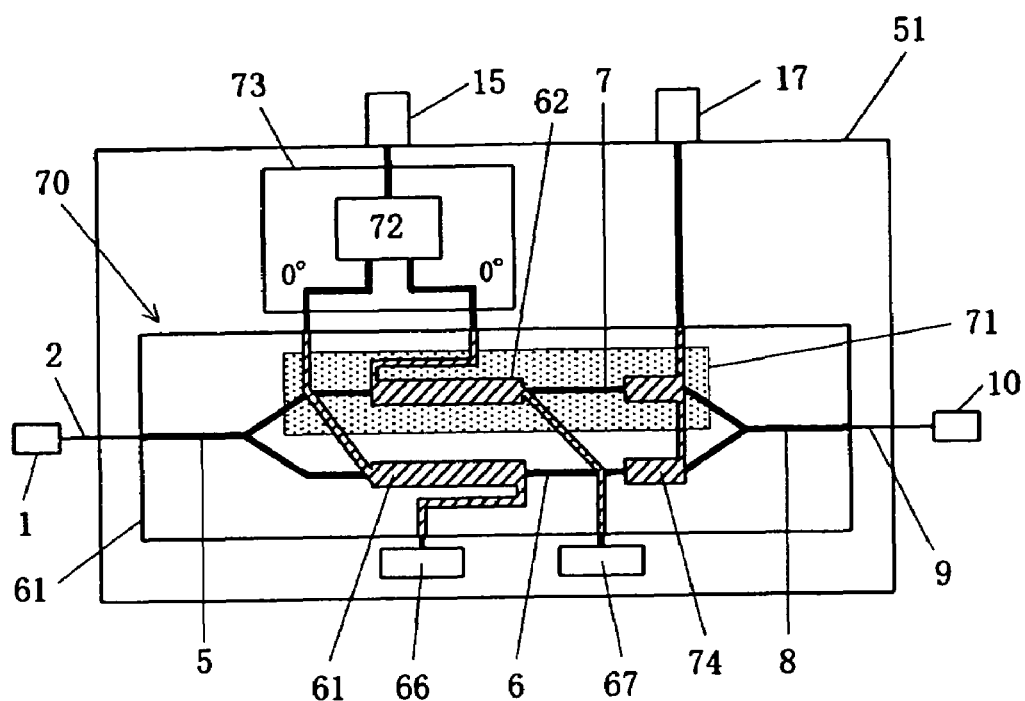
FIG. 6 is a schematic diagram showing an optical modulation element module according to another embodiment of the invention.

In addition, another embodiment according to the invention is shown in FIG. 6.

A modulation signal branching circuit 73 uses a transmission-line transformer whose input impedance is 50 Ω, output impedance is 50 Ω, and a phase difference of the output signals is 0°. As such transformer, whose phase difference is 0°, a broader band transformer than that of FIG. 5 can be easily obtained, and it is further possible to make the frequency response properties broader.

The Z-cut LN crystal substrate 61 as shown in FIG. 6 includes a domain-inverted region 71. Also, as with the embodiment of FIG. 5, the MZ type waveguides 5 to 8 are formed by Ti diffusion on the LN substrate 61. The Z-cut LN crystal substrate 61 also includes modulation electrodes 61, 62, a ground electrode (not shown in the drawings), and a bias electrode 74. The bias electrode is configured to generate the electric field into two branched waveguides 6, 7. The bias electrode also can be formed in only one branched waveguide.

In the embodiment as shown in FIG. 6, in the experimental optical modulation element module, a modulator with almost zero chirp in which at 50 MHz to 1 GHz, the change of the electric optical frequency response is less than 1 dB, the reflection of the electric is less than −18 dB, and the absolute value of line-width increasing coefficient α, which indicates the amount of the chirp of the modulator, is less than 0.1, can be obtained.

In the embodiments in FIGS. 5 and 6, the transformer branching unit 63, 72 matches the input impedance with the modulation signal input impedance, and matches the output impedance with the line impedance of 50 Ω of the modulation electrode. Accordingly, it is possible to control the reflection of the modulation signals between the connected lines and to provide the optical modulator having higher frequency properties by matching respective impedances.

Additionally, it is possible to adjust the output impedance of the transformer branching unit according to the corresponding line impedance by reducing the line impedance of the modulation electrode to 50 Ω or less. It is also possible to reduce the interval narrowly between the modulation electrode and the ground electrode of the optical modulation element by using the low line impedance. It is also possible to execute high-efficiency modulation by increasing the distribution of the electric field which is applied to the waveguide. As the result, it is possible to further reduce the driving voltage of the optical modulation element.

As above described, the optical modulation element module according to one embodiment of the invention may provide the optical modulation element module capable of the optical modulation for analog transmission with a low driving voltage and low chirp.

What is claimed is:

1. An optical modulation element module, comprising:

a Mach-Zehnder type optical modulation element having a Mach-Zehnder type waveguide unit with two branched waveguides formed on a substrate with electro-optical effect and two independent modulation electrodes disposed corresponding to each branched waveguide, optical input and output units for inputting and outputting a light wave to and from the optical modulation element, and a modulation signal input unit for inputting the modulation signal into the modulation electrodes, in a case, further comprising:

a transformer branching unit which has the modulation signal input unit formed as one terminal, which divides the modulation signal from the modulation signal input unit into two modulation signals, and which applies the divided modulation signals to each modulation electrode, wherein, in the transformer branching unit, an electric power branching rate of an output port is 1:1 and a phase difference of each branched signal is 180°, and further in the transformer branching unit, an input impedance is matched with an impedance of the modulation signal input unit with an impedance value of 50 Ω, and an output impedance is matched with a line impedance of each modulation electrode with an impedance value of 50 Ω or less.

2. An optical modulation element module, comprising:

a Mach-Zehnder type optical modulation element having a Mach-Zehnder type waveguide unit with two branched waveguides formed on a substrate with electro-optical effect and two independent modulation electrodes disposed corresponding to each branched waveguide, optical input and output units for inputting and outputting a light wave to and from the optical modulation element, and a modulation signal input unit for inputting the modulation signal into the modulation electrodes, in a case, further comprising:

a transformer branching unit which has the modulation signal input unit formed as one terminal, which divides the modulation signal from the modulation signal input unit into two modulation signals, and which applies the divided modulation signals to each modulation electrode, wherein, in a region in which one of the branched waveguides of the Mach-Zehnder type optical modulation element is formed, a crystal axis of the substrate is domain-inverted, and in the transformer branching unit, an electric power branching rate of an output port is 1:1 and a phase difference of each branched signal is 0°, and further in the transformer branching unit, an input impedance is matched with an impedance of the modulation signal input unit with an impedance value of 50 Ω, and an output impedance is matched with a line impedance of each modulation electrode with an impedance value of 50 Ω or less.

3. The optical modulation element module according to claim 1,
wherein the substrate of the Mach-Zehnder type optical modulation element is a Z-cut $LiNbO_3$ substrate.

4. The optical modulation element module according to claim 2,
wherein the substrate of the Mach-Zehnder type optical modulation element is a Z-cut $LiNbO_3$ substrate.

5. The optical modulation element module according to claim 1,
wherein the transformer branching unit uses a transmission line type transformer.

6. The optical modulation element module according to claim 2,
wherein the transformer branching unit uses a transmission line type transformer.

* * * * *